United States Patent
Bist et al.

(10) Patent No.: US 6,275,527 B1
(45) Date of Patent: *Aug. 14, 2001

(54) PRE-QUANTIZATION IN MOTION COMPENSATED VIDEO CODING

(75) Inventors: Anurag Bist, Irvine; Wei Wu, Newbury Park; Albert A-Chuan Hsueh, Laguna Niguel, all of CA (US)

(73) Assignee: Conexant Systems, Inc., Newport Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,972

(22) Filed: Jan. 14, 1998

(51) Int. Cl.[7] ....................................... H04N 7/12
(52) U.S. Cl. ..................... 375/240; 382/239; 382/232; 382/233
(58) Field of Search .................... 348/416, 411, 348/412, 413, 415, 699, 700, 405, 420, 421

(56) References Cited

U.S. PATENT DOCUMENTS

| | | | |
|---|---|---|---|
| 5,163,103 | * 11/1992 | Uetani | 382/56 |
| 5,459,518 | * 10/1995 | Wickstrom et al. | 348/420 |
| 5,565,921 | * 10/1996 | Sasaki et al. | 348/409 |
| 5,592,226 | * 1/1997 | Lee et al. | 348/413 |
| 5,617,149 | * 4/1997 | Lee et al. | 348/699 |
| 5,719,961 | * 2/1998 | Normile et al. | 382/239 |
| 5,751,357 | * 5/1998 | Geib | 348/400 |
| 5,793,430 | * 8/1998 | Hackett et al. | 348/416 |
| 5,835,147 | * 11/1998 | Florentine et al. | 348/416 |
| 5,883,672 | * 3/1999 | Suzuki et al. | 348/405 |

* cited by examiner

Primary Examiner—Chris Kelley
Assistant Examiner—Shawn S. An
(74) Attorney, Agent, or Firm—Farjami & Farjami LLP

(57) ABSTRACT

Apparatus and methods are provided for encoding video data in a manner which significantly reduces the computation performed by the video encoder and the video decoder without suffering any degradation in the perceived quality of the compressed video data. In particular, apparatus and methods are provided for determining which blocks might be zeroed out after quantization. This determination is performed after motion estimation, the classification of the frame as either an I frame, P frame, or a B frame, and the determination of a quantization step size (QP) for the block, but before DCT. If a given block is determined to be a "zero" quantized block, then the DCT, quantization, zig-zag scan and variable length coding steps are omitted, and a variable length code output is provided indicating that the block B is a "zero" quantized block. The present invention determines which blocks might be zeroed out after quantization by using one or more key features of the motion compensated blocks which will help in classifying these blocks into zero and non-zero blocks. Examples of these features include the mean absolute value of a block, the mean square error of a block, the block variance, the mean absolute difference of a block, and the maximum value in a block. Each feature is provided with a predetermined threshold that has been experimentally calculated.

3 Claims, 10 Drawing Sheets

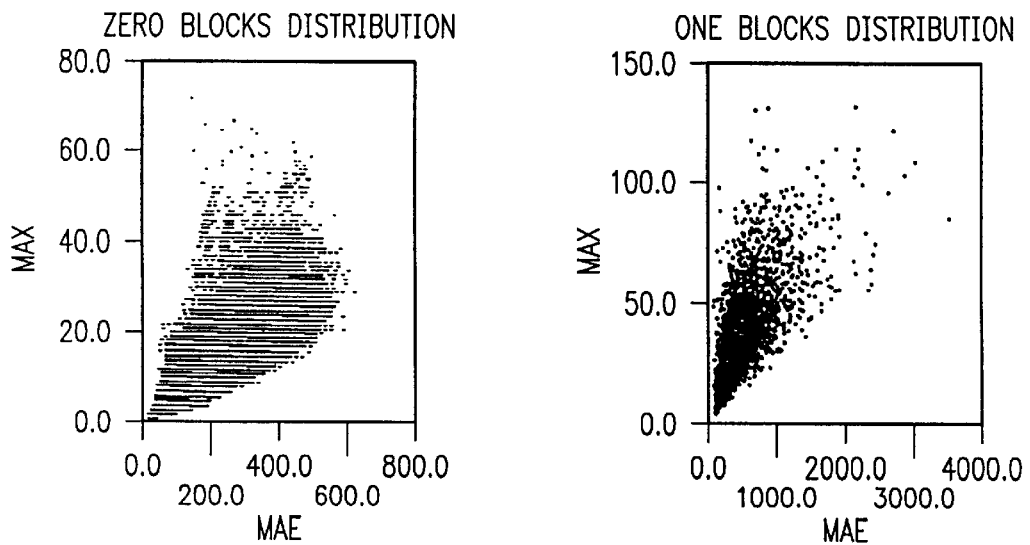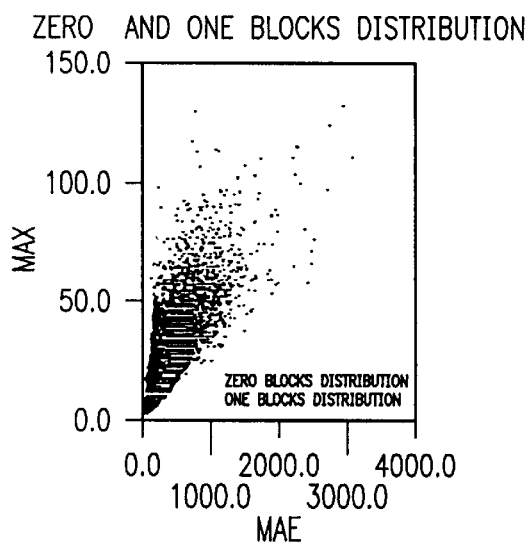
FIG. 10

PRE-QUANTIZATION IN MOTION COMPENSATED VIDEO CODING

BACKGROUND OF THE INVENTION

1. Field of the Invention

The present invention relates generally to video coding, and in particular, to pre-quantization of motion compensated blocks for video coding at very low bit rates. The present invention provides a method and an apparatus for significantly reducing the number of computations at a video encoder.

2. Background Art

FIG. 1 illustrates the general structural blocks that are used for, and the steps involved in, the conventional digital coding of a sequence of video images. In particular, the video image is made up of a sequence of video frames 10 that are captured, such as by a digital camera, and transmitted to a video encoder 12. The video encoder 12 receives the digital data on a frame-by-frame and macroblock-by-macroblock basis, and applies a video encoding algorithm to compress the video data. In some applications, the video encoding algorithm can also be implemented in hardware. The video encoder 12 generates an output which consists of a binary bit stream 14 that is processed by a modulator 16. The modulator 16 modulates the binary bit stream 14 and provides the appropriate error protection. The modulated binary bit stream 14 is then transmitted over an appropriate transmission channel 18, such as through a wireless connection (e.g., radio frequency), a wired connection, or via the Internet. The transmission can be done in an analog format (e.g., over phone lines or via satellite) or in a digital format (e.g., via ISDN or cable). The transmitted binary bit stream 14 is then demodulated by a demodulator 20 and provided to a video decoder 22. The video decoder 22 takes the demodulated binary bit stream 24 and converts or decodes it into sequential video frames. These video frames are then provided to a display 26, such as a television screen or monitor, where they can be viewed. If the transmission channel 18 utilizes an analog format, a digital-to-analog converter is provided at the modulator 16 to convert the digital video data to analog form for transmission, and an analog-to-digital converter is provided at the demodulator to convert the analog signals back into digital form for decoding and display.

The video encoding can be embodied in a variety of ways. For example, the actual scene or image can be captured by a camera and provided to a chipset for video encoding. This chipset could take the form of an add-on card that is added to a personal computer (PC). As another example, the camera can include an on-board chip that performs the video encoding. This on-board chip could take the form of an add-on card that is added to a PC, or as a separate stand-alone video phone. As yet another example, the camera could be provided on a PC and the images provided directly to the processor on the PC which performs the video encoding.

Similarly, the video decoder 22 can be embodied in the form of a chip that is incorporated either into a PC or into a video box that is connected to a display unit, such as a monitor or television set.

Each digital video frame 10 is made up of x columns and y rows of pixels (also known as "pels"). In a typical frame 10 (see FIG. 2), there could be 720 columns and 640 rows of pels. Since each pel contains 8 bits of data (for luminance data), each frame 10 could have over three million bits of data (for luminance data). If we include chrominance data, each pel has up to 24 bits of data, so that this number is even greater. This large quantity of data is unsuitable for data storage or transmission because most applications have limited storage (i.e., memory) or limited channel bandwidth. To respond to the large quantity of data that has to be stored or transmitted, techniques have been provided for compressing the data from one frame 10 or a sequence of frames 10 to provide an output that contains a minimal amount of data. This process of compressing large amounts of data from successive video frames is called video compression, and is performed in the video encoder 12.

During conventional video encoding, the video encoder 12 will take each frame 10 and divide it into blocks. In particular, each frame 10 can be first divided into macroblocks MB, as shown in FIG. 2. Each of these macroblocks MB can have, for example, 16 rows and 16 columns of pels. Each macroblock MB can be further divided into four blocks B, each block having 8 rows and 8 columns of pels. Once each frame 10 has been divided into blocks B, the video encoder 12 is ready to compress the data in the frame 10.

FIG. 3 illustrates the different steps, and the possible hardware components, that are used by the conventional video encoder 12 to carry out the video compression. Each frame 10 is provided to a motion estimation engine 30 which performs motion estimation. Since each frame 10 contains a plurality of blocks B, the following steps will process each frame 10 on a block-by-block basis.

Motion estimation calculates the displacement of one frame in a sequence with respect to the previous frame. By calculating the displacement on a block basis, a displaced frame difference can be computed which is easier to code, thereby reducing temporal redundancies. For example, since the background of a picture or image usually does not change, the entire frame does not need to be encoded, and only the moving objects within that frame (i.e., representing the differences between sequential frames) need to be encoded. Motion estimation will predict how much the moving object will move in the next frame based on certain motion vectors, and will then take the object and move it from a previously reconstructed frame to form a predicted frame. At the video decoder 22, the previously reconstructed frame, together with the motion vectors used for that frame, will reproduce the predicted frame at the video decoder 22 (also known as "motion compensation"). The predicted frame is then subtracted from the previously reconstructed frame to obtain an "error" frame. This "error" frame will contain zeros at the pels where the background did not move from the previously reconstructed frame to the predicted frame. Since the background makes up a large part of the picture or image, the "error" frame will typically contain many zeros.

Each frame 10 can be either an "intraframe" (also known as "I" frame) or an "interframe" (also known as "P" frame). Each I frame is coded independently, while each P frame depends on previous frames. In other words, a P frame uses temporal data from previous P frames to remove temporal redundancies. An example of a temporal redundancy can be the background of an image that does not move from one frame to another, as described above. For example, the "error" frame described above would be a P frame. In addition to I and P frames, there also exists another type of frame, known as a "B" frame, which uses both previous and future frames for prediction purposes.

Now, referring back to FIG. 3, all digital frames 10 received from the motion estimation engine 30 are provided to a frame-type decision engine 40, which operates to divide all the incoming frames 10 into I frames, P frames and B frames. Whether a frame 10 becomes an I, P or B frame is determined by the amount of motion experienced by that frame 10, the degradation of distortion, type of channel decisions, and desired user parameters, among other factors. From this point onward, all I, P and B frames are processed in the same manner.

Each block B from each frame 10 is now provided to a QP decision engine 50 which determines a QP or quantization step size number for the block or groups of blocks. This QP number is determined by a rate control mechanism which divides a fixed bit budget of a frame among different blocks, and is used by the quantization engine 80 to carry out quantization as described below.

Each block B is now provided to a DCT engine 60. DCT of individual blocks helps in removing the spatial redundancy by bringing down the most relevant information into the lower most coefficients in the DCT domain. DCT can be accomplished by carrying out a Fourier-like transformation of the values in each block B. DCT produces a transformed block 70 in which the zeros and lower values are placed in the top left corner 72 of the transformed block 70, and the higher frequency values are placed in the bottom right corner 74.

After having obtained a block 70 of DCT coefficients which contain the energy of the displaced blocks, quantization of these blocks 70 is performed by quantization engine 80. Quantization is a uniform quantization with a step size (i.e., the predetermined QP) varying within a certain range, such as from 2 to 62. It is implemented as a division, or as a table look-up operation for a fixed-point implementation, of each value in the transformed block 70. For example, the quantization level for each value in the block 70 can be determined by dividing the value by 2QP. Therefore, if QP is 10 and a value in the block is 100, then the quantization level for this level is equal to 100 divided by 2QP, or 5. At the video decoder 22 in FIG. 1, the value is reconstructed by multiplying the quantization level (i.e., 5) by 2QP to obtain the original value of 100. Thus, quantization takes a finite set of values and maps the set of values, providing a quantized block 90 where the top left corner 92 contains higher quantized levels, and the bottom right corner 94 contains mostly zeros.

Next, the quantized block 90 is provided to a zig-zag scan engine 100 which performs a zig-zag scan of the values in the block 90. The direction of the scan is illustrated in FIG. 4, and begins from the top left corner 92, which contains the higher quantized levels, through the middle of the block 90 and to the bottom right corner 94, which contains mostly zeros. The zig-zag scan produces a zig-zag scan block 110 in which the quantized values from the quantized block 90 are positioned linearly across the zig-zag scan block 110. Therefore, zig-zag scan emulates going from a lower to a higher frequency, thereby resulting in long runs of zeros in the zig-zag scan block 110. The values in the zig-zag scan block 110 are then provided to a variable length coding engine 120 where entropy coding is performed. Traditionally, most video coding standards use huffman coding for entropy coding. First, a non-zero value followed by runs of zeros is encoded as a single "event". For example, "400000000000" and "10000000000000" would each be encoded as separate single events. Entropy coding is then performed on these events to generate a unique binary code for each event. These binary codes are output as the binary bitstream 14 described above. These unique binary codes can be recognized by the video decoder 22 and decoded by the video decoder 22 into the original values (i.e., non-zero values followed by runs of zeros).

Thus, the conventional video encoder 12 and its operation, as illustrated in FIG. 3, function to minimize (i.e., compress) the large number of bits at the input blocks B of each frame 10 (see FIG. 2) to a minimal number of bits at the bitstream 14, taking advantage of the fact that the DCT and quantization steps will produce multiple runs of zeros. The transmitted bitstream 14 is decoded by the video decoder 22 by reversing the steps performed by the video encoder 12.

The values in each frame 10 can represent different meanings. For example, in an I frame, each value can range from zero to 255, with zero representing the darkest (or black) pel, and 255 representing the brightest pel. In a P frame, each value can range from −128 to +127, with −128 and +127 representing the maximum residual value possible or a lot of edge information, and zero representing no residual.

While the above-described conventional video encoder 12 and method is effective in compressing the amount of data to be transmitted, it requires much computation and therefore increases the time and cost of the video encoder 12 and video decoder 22. In particular, motion estimation is the most computationally intensive part of the video encoding process, and often accounts for more than half of the processing. For this reason, many video encoding solutions prefer to perform motion estimation either by using dedicated hardware, or by some fast sub-optimal software scheme. Dedicated hardware can be realized as an ASIC (Application Specific Integrated Circuit) or as an FPGA (Field Programmable Gate Array). While dedicated hardware provides fast and accurate motion estimation, it can be very expensive. As a result, software schemes are often preferred because they are less expensive. These software schemes achieve fast motion estimation by doing a sub-optimal search using the inherent processor of a PC or workstation. Unfortunately, the motion estimation performed by these software schemes are generally less accurate.

Although motion estimation is the most computationally intensive part of the video encoding process, DCT, quantization, zig-zag scanning and variable length coding are also computationally intensive. Unfortunately, in the conventional video encoding and decoding method, all frames 10 must go through DCT, quantization, zig-zag scan and variable length coding.

Thus, there still remains a need for a video encoder and method which significantly reduces the computation performed by the video encoder and the video decoder without suffering any degradation in the perceived quality of the compressed video data.

SUMMARY OF THE INVENTION

The present invention provides apparatus and methods for encoding video data in a manner which significantly reduces the computation performed by the video encoder and the video decoder without suffering any degradation in the perceived quality of the compressed video data. In particular, the present invention provides apparatus and methods for determining which blocks might be zeroed out after quantization. This determination is performed after motion estimation, the classification of the frame as either an I frame, a P frame, or a B frame, and the determination of a quantization step size (QP) for the block, but before DCT. If a given block is determined to be a "zero" quantized block, then the video encoder and method of the present invention skips or omits the DCT, quantization, zig-zag scan and variable length coding steps, and merely transmits a variable length code output indicating that the block B is a "zero" quantized block.

The present invention determines which blocks might be zeroed out after quantization by using one or more key features of the motion compensated blocks which will help in classifying these blocks into zero and non-zero blocks. Examples of these features include the mean absolute value of a block, the mean square error of a block, the block variance, the mean absolute difference of a block, and the maximum value in a block. Each feature is provided with a predetermined threshold that has been experimentally calculated. Each of these features is easy to compute and is based on first or second ordered moments of the motion compensated blocks.

In the present invention, each feature is used to compute a value for a given block, with the feature value of that block compared to its predetermined threshold. The block is classified as a zero quantized block if the feature value of that block is less than or equal to the threshold.

In accordance with one embodiment of the present invention, one or more features may be used jointly to determine whether the block should be classified as a zero quantized block. In accordance with another embodiment of the present invention, a selector is provided to select one of a plurality of features to be used in the determination.

Thus, by skipping the DCT, quantization, zig-zag scan and variable length coding steps for zero-quantized blocks, the present invention significantly reduces the computations required by the video encoder. There is also little or no degradation in the perceived quality of the compressed video data because the thresholds for the features can be experimentally determined and selected so as to minimize the potential of misclassifying blocks.

BRIEF DESCRIPTION OF THE DRAWINGS

FIG. 10 illustrates the distribution of zero blocks and one blocks in SAE-MAX feature space.

DETAILED DESCRIPTION OF THE INVENTION

Figure 1:
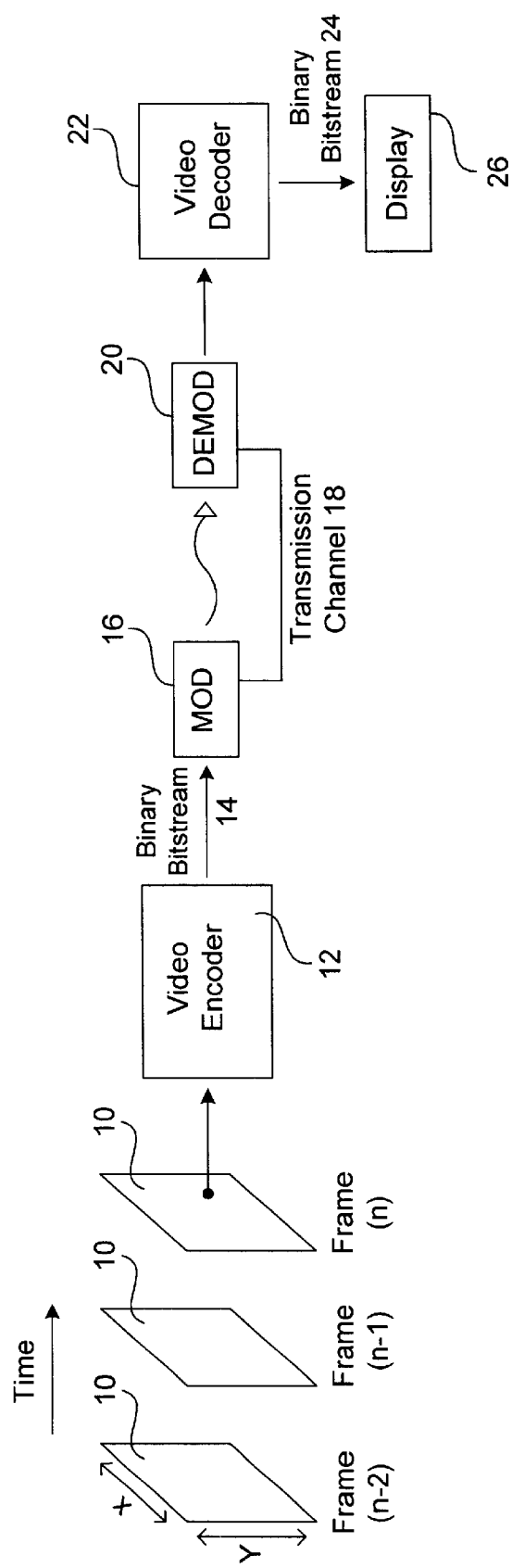
FIG. 1 illustrates the general structural blocks that are used for, and the steps involved in, the conventional digital coding of a sequence of video images.
Figure 2:
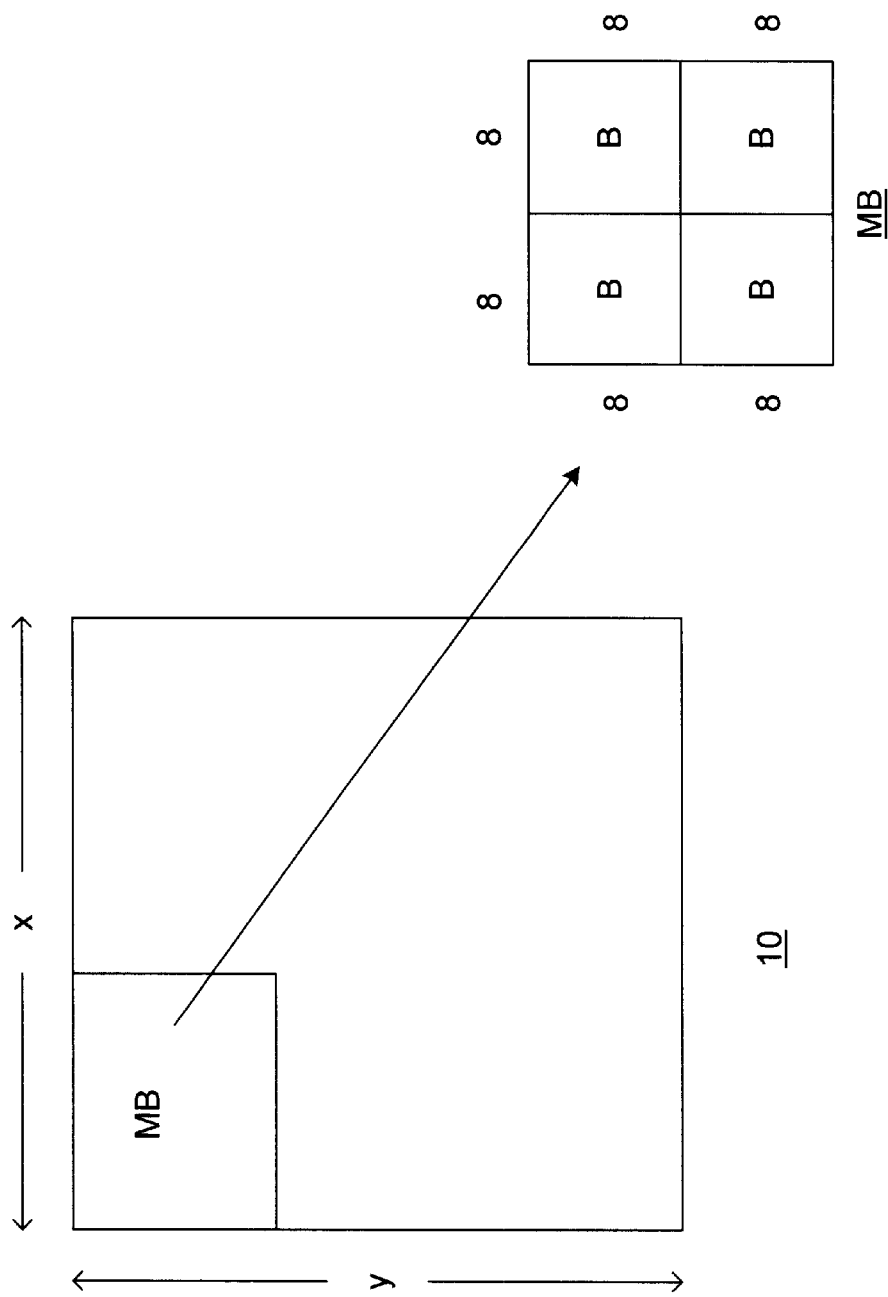
FIG. 2 is a simplified illustration of one frame of video data, and the macroblocks and blocks that make up this frame.

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known or conventional data processing techniques, hardware devices and circuits are omitted so as to not obscure the description of the present invention with unnecessary detail.

The video encoding method and apparatus according to the present invention is based on the observation that a majority of quantized blocks 90 are zero (i.e., all the values in the block 90 are zero). Even though these "zero" quantized blocks 90 would only produce a simple variable length code output 14, these "zero" quantized blocks 90 would still have to go through DCT, quantization and variable length coding at the video encoder 12. This means that if it can be detected a priori which blocks 90 would be zeroed out after quantization, the hardware and steps for DCT, quantization, and variable length coding can be omitted, thereby significantly reducing the computations required for a large number of blocks B. This in turn would translate to a significant reduction in computations at the video encoder 12 and the video decoder 22.

As a result, the present invention provides apparatus and methods for determining which blocks might be zeroed out after quantization with minimal or no loss in the perceived quality of the compressed video data. This determination is performed prior to the DCT step. If a given block B exiting from the QP engine is determined to be a "zero" quantized block, then the video encoder of the present invention skips or omits the DCT, quantization, zig-zag scan and variable length coding steps, and merely transmits a variable length code output indicating that the block B is a "zero" quantized block.

Figure 3:
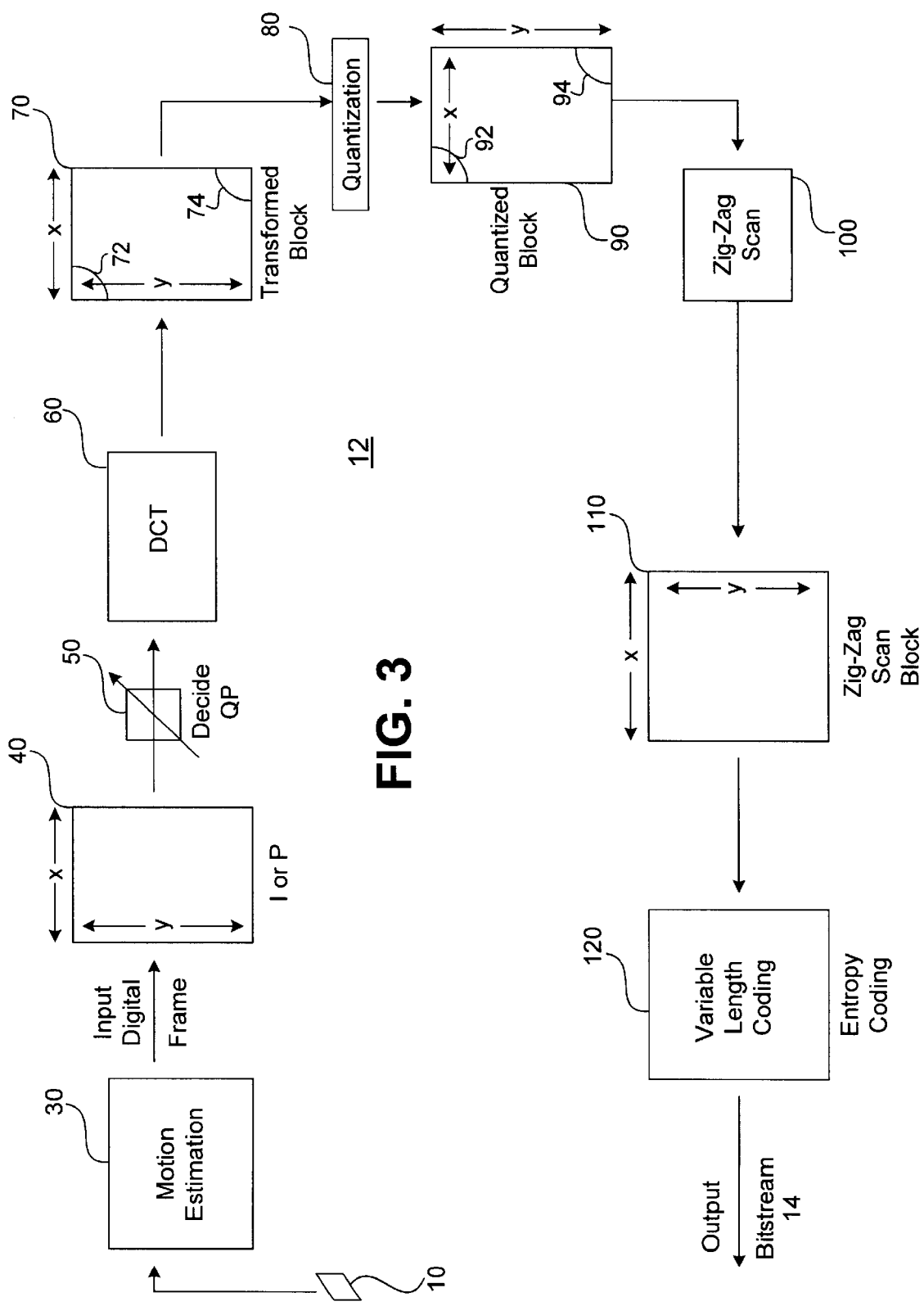
FIG. 3 illustrates the different steps, and the hardware components, that are used by the video encoder of FIG. 1 to carry out conventional video compression.
Figure 4:
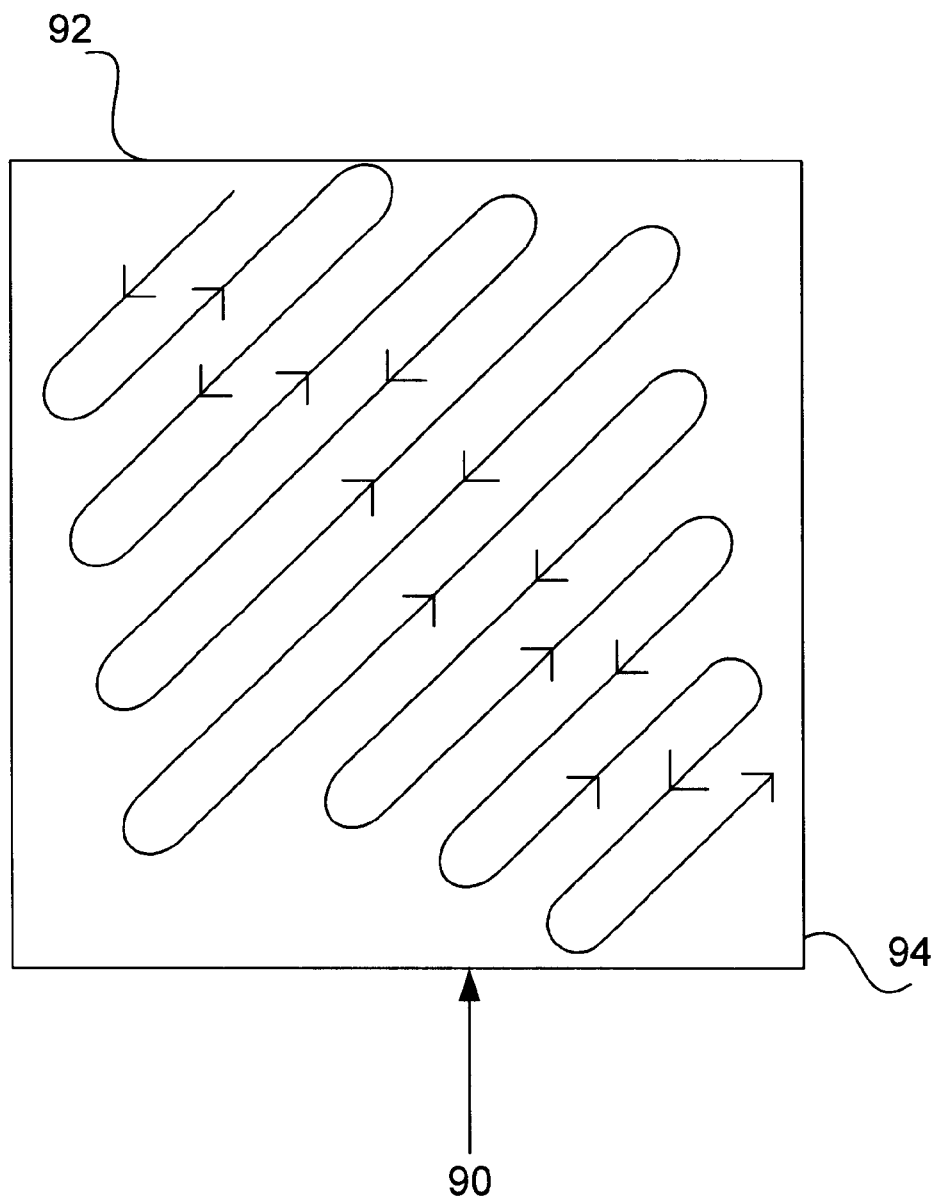
FIG. 4 is a simplified illustration of how a quantized block of data is scanned in a zig-zag manner.
Figure 5:
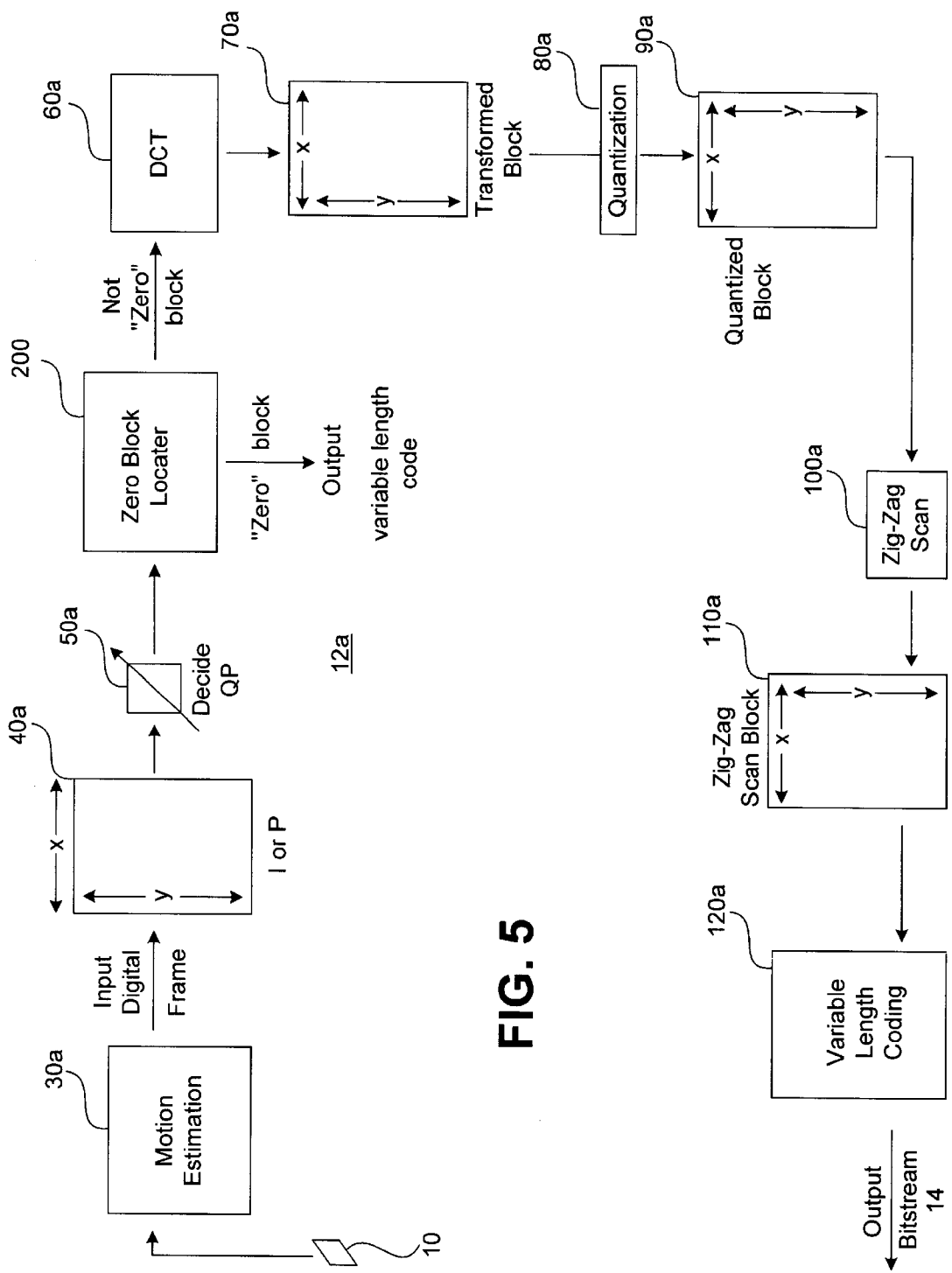
FIG. 5 illustrates the different steps, and the hardware components, that are used by the video encoder according to one embodiment of the present invention.

FIG. 5 provides a general schematic illustration of the present invention as embodied in a video encoder 12a according to the present invention. The video encoder 12a is similar to the conventional video encoder 12 illustrated in FIG. 3, with the engines and transformed blocks of FIG. 5 being assigned the same numerals as the corresponding engines and transformed blocks of FIG. 3, except that an "a" has been added to the engines and transformed blocks of FIG. 5. Therefore, the operation of the common components in FIGS. 3 and 5 will not be repeated herein.

As illustrated in FIG. 5, the video encoder 12a according to the present invention provides a zero block locater engine 200 between the QP engine 50a and the DCT engine 60a. If a given block B exiting from the QP engine 50a is determined to be a "zero" quantized block 90a, then the zero block locater engine 200 merely transmits a variable length code output indicating that the block B is a "zero" quantized block 90a. Otherwise, the block B is transmitted to the DCT engine 60a and put through the DCT, quantization, zig-zag scan and variable length coding steps to produce a binary bit stream 14 that is output to the modulator 16.

The zero block locater engine 200 utilizes one or more key features of the motion compensated blocks which will help in classifying these blocks into zero and non-zero blocks. A preferred feature is one that would allow accurate classification of the blocks while involving minimal computations. A few non-limiting features are set forth hereinbelow. Each of these features are easy to compute and are based on first or second ordered moments of the motion compensated blocks.

a. "Mean Absolute Error" or SAE

A first feature is the "mean absolute error", or SAE, which is calculated as follows:

$$SAE = \sum_{i=1}^{x} \sum_{j=1}^{y} f(i, j)$$

where f(i, j) is a pel value of the block. SAE involves summing the magnitude of the values of all the pels in a block. Therefore, assuming that the values in a given block B exiting the QP engine 50a is [0, −3, −4, 0, 0 . . . 7], the SAE value will be [0+3+4 +0+. . . +7]=14. SAE is a good indicator of the activity of a block. A high SAE value will usually indicate that the block contains significant residual, indicating that the motion estimation was not efficient for this block.

b. "Mean Square Error" or MSE

A second feature is the "mean absolute error", or MSE, which is calculated as follows:

$$MSE = \sum_{i=1}^{x} \sum_{j=1}^{y} f^2(i, j)$$

where f(i, j) is a pel value of the block. MSE involves summing the square of the values of all the pels in a block. Therefore, assuming that the values in a given block B exiting the QP engine 50a is [0, −3, −4, 0, 0 . . . ,7], the MSE value will be [0+9+ 16+0+. . . +49]=74. MSE is a good indicator of how much change a block has experienced since its original image.

c. "Block Variance" or VAR

A third feature is the "block variance", or VAR, which is calculated as follows:

$$VAR = \sum_{i=1}^{x} \sum_{j=1}^{y} [f(i, j) - u]^2$$

where f(i, j) is a pel value of the block, and $$u = 1/xy \sum_{i=1}^{x} \sum_{j=1}^{y} f(i, j)$$

where u is essentially the mean of all the values in the block. VAR indicates how much the block varies within itself.

d. "Mean Absolute Difference" or MAD

A fourth feature is the "mean absolute difference", or MAD, which is calculated as follows:

$$MAD = \sum_{i=1}^{x} \sum_{j=1}^{y} f(i, j) - u$$

where f(i, j) is a pel value of the block, and $$u = 1/xy \sum_{i=1}^{x} \sum_{j=1}^{y} f(i, j)$$

MAD indicates the local variance within a block, and is similar to VAR.

e. "Maximum Value" or MAX

A fifth feature is the "maximum value", or MAX, of the pel values in the block:

MAX=max{f(i,j), i=0, . . . ,x, j=0, . . . ,y} where f(i, j) is a pel value of the block. MAX is a good indicator of the presence of any edges which should be detected because edge values tend to be higher.

Any or all of the above features can be used in classifying the motion compensated blocks as "zero" or "one". A "zero" block is defined as a block with all zero quantized DCT coefficients and a "one" block is a block with at least one non-zero quantized DCT coefficient.

For doing the classification, one or more of the above features are selected, and each uses an experimentally determined threshold to decide whether or not a block should be classified as a "zero" block. If the value calculated by the selected feature (also referred to as "feature value") is greater than the specific threshold for that feature, then the block is classified as a "one" block, otherwise it is classified as a "zero" block. Thus, these thresholds can be selected to minimize the potential of erroneously classifying blocks (e.g., misclassify a "zero" block as a "one" block, or vice versa).

The thresholds for all the above-described features are experimentally determined. To determine the optimal threshold for each feature, the methods described in FIGS. 6–8 below are implemented for a given sequence of blocks by using different threshold values. The accuracy provided by each threshold is then compared with the actual result (i.e., which of the sequence of blocks are actual "zero" blocks?) obtained by putting that sequence of blocks through the entire encoding process of FIG. 3. The "misdetection rate" and the "false alarm rate" can then be measured for each threshold of each feature. A small "misdetection rate" means that most actual "zero" blocks will be classified as "zero" blocks. A negligible "false alarm rate" means that a very small number of true "non-zero" blocks will be classified as "zero" blocks. The experimentation can be iterated by changing the thresholds until the desired "misdetection rate" and "false alarm rate" have been obtained for a given feature. Ideally, low values for both the "misdetection rate" and "false alarm rate" means that the perceived quality of the encoded video sequence will be good.

The thresholds for each feature can be varied, recognizing that there will be a trade-off between the amount of computational savings and the overall perceived quality of the encoded video sequence. For example, by selecting slightly lower thresholds, the system 12a can further reduce the number of computations (because certain "one" blocks may be classified as "zero" blocks and therefore not processed), but there will also be slight degradation of the perceived quality of the encoded video sequence. In a preferred embodiment of the present invention, the thresholds for each feature are selected so that there is no degradation in the perceived quality of the encoded video sequence. Even though the present invention would select higher thresholds, the present invention still provides large computational savings, as described herein.

The thresholds can also be varied for different blocks and/or frames during the encoding process, or the same threshold can be used for the entire encoding process. For example, a certain higher threshold can be used during a certain portion of the encoding for a particular sequence of video images where degradation in the perceived quality of the encoded video sequence is less tolerated, while a lower threshold can be used during other portions of the encoding where some degradation in the perceived quality of the encoded video sequence can be tolerated.

In addition, different types of frames (i.e., I, P or B) can be provided with different experimentally-determined thresholds. These frames may be provided with different thresholds because different types of data are carried by the different types of frames.

Figure 6:
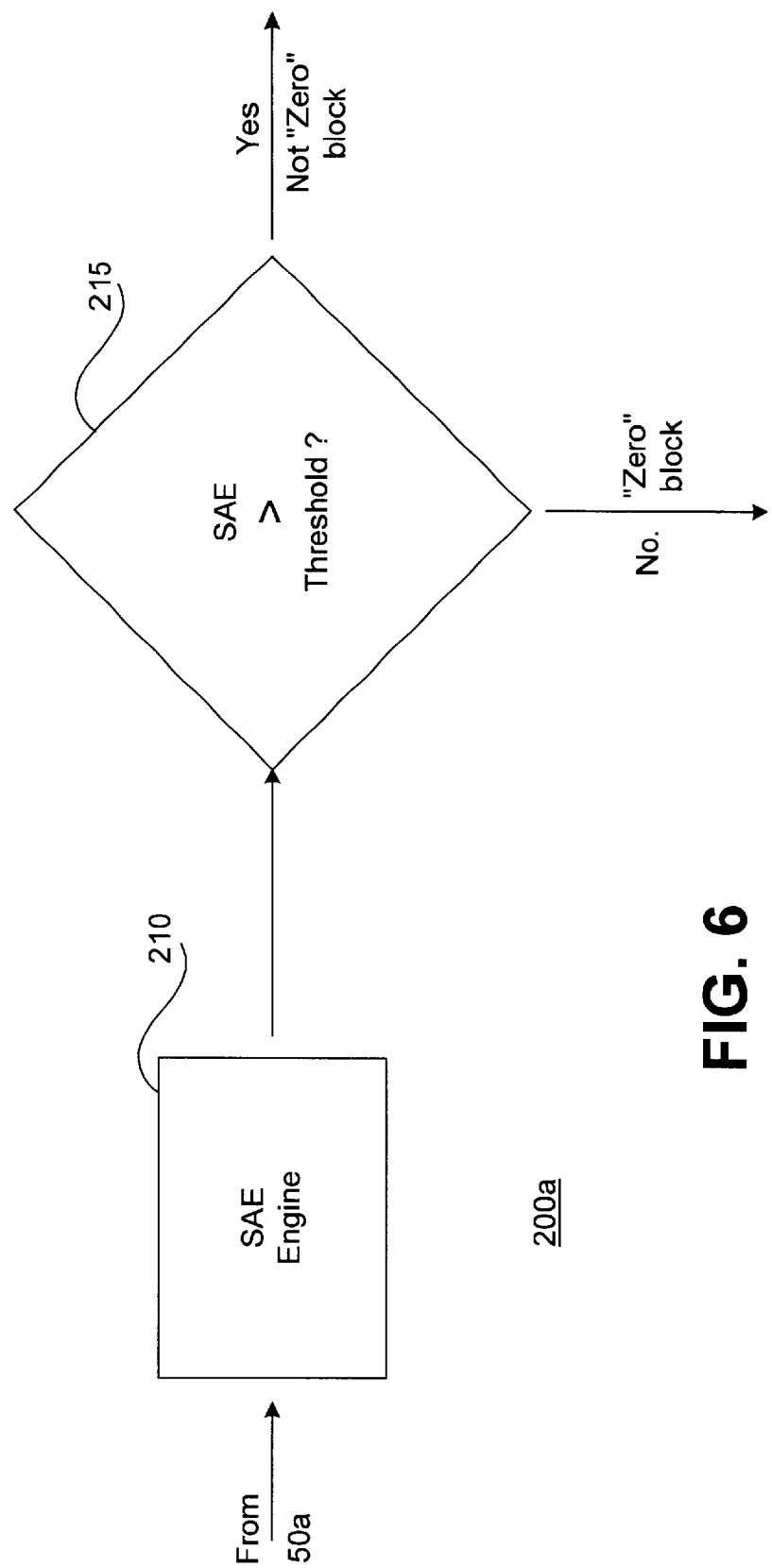
FIG. 6 illustrates a first embodiment of the zero block locater engine of FIG. 5.

FIG. 6 illustrates one embodiment of the zero block locater engine 200a according to the present invention. The zero block locater engine 200a includes an SAE engine 210 which computes the SAE for the particular block B exiting from the QP engine 50a. The SAE value of this block B is then provided to a comparator 215 which determines whether the SAE value is above a predetermined threshold. If the SAE value is greater than the SAE threshold, then the block B is classified as a "one" block and the values of the block B are provided to the DCT engine 60a for further processing as illustrated and described in connection with FIGS. 3 and 5. If the SAE value is less than or equal to the SAE threshold, then the block B is classified as a "zero" block and the comparator 215 transmits a variable length code output indicating that the block B is a "zero" quantized block. In accordance with a preferred embodiment of the present invention, the SAE threshold is selected to be K*QP, where K is equal to 20. It is also possible to vary this threshold within the encoding process (for different frames and/or blocks) by providing different values for K.

SAE is selected as the preferred feature in the embodiment 210a of FIG. 6 because SAE is computationally less intensive than MSE, MAD or VAR. In addition, the inventors have determined that SAE and MSE exhibit the best performance; in other words, SAE and MSE minimize the potential of erroneously misclassifying blocks.

Figure 7:
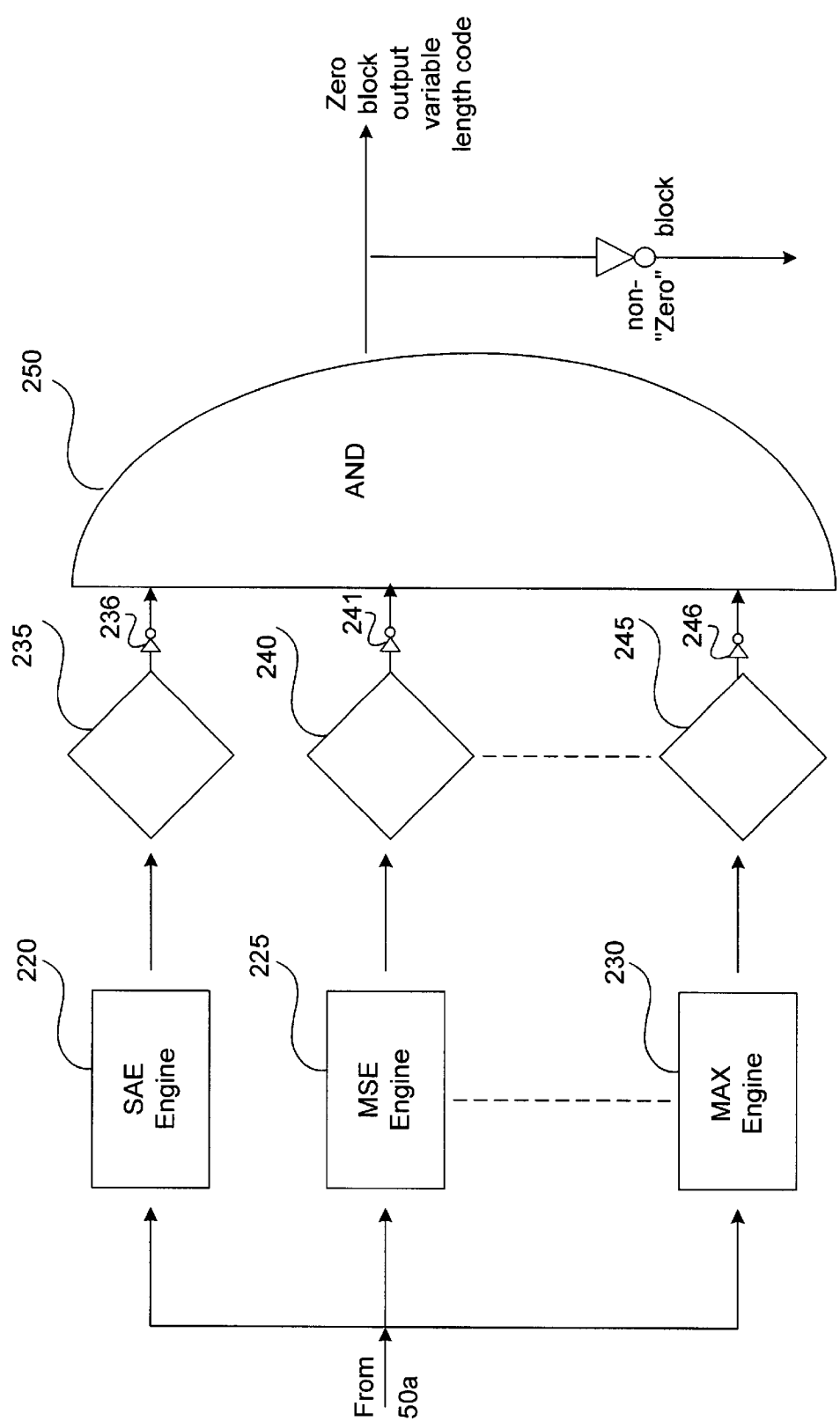
FIG. 7 illustrates a second embodiment of the zero block locater engine of FIG. 5.

FIG. 7 illustrates another embodiment of the zero block locater engine 200b according to the present invention. The zero block locater engine 200b includes a plurality of feature engines, including for example, an SAE engine 220 which computes the SAE for the particular block B exiting from the QP engine 50a, an MSE engine 225 which computes the MSE for the particular block B exiting from the QP engine 50a, and a MAX engine 230 which computes the maximum value for the particular block B exiting from the QP engine 50a. Similar MAD and VAR engines can be provided as well if desired. The value of each feature is then provided to a separate comparator 235, 240 and 245, respectively, which determines whether the value of the feature is above the predetermined threshold for that feature. The output of the comparator 235, 240, 245 is in turn provided to a corresponding inverter or NOT gate 236, 241, 246, respectively. The outputs of these NOT gates are coupled to an AND gate 250.

If the value of a feature is greater than that feature's threshold, then the comparator 235, 240, 245 outputs a "1" to the respective NOT gate 236, 241 or 246. If the value of a feature is less than or equal to that feature's threshold, then the comparator 235, 240, 245 outputs a "0" to the respective NOT gate 236, 241 or 246.

If all of the comparators 235, 240, 245 output a "0", then the block B is classified as a "zero" block and a variable length code output (indicating that the block B is a "zero" quantized block) is transmitted to the modulator 16. However, if the output of just one comparator 235, 240 or 245 is "1", then the block "B" will be classified as a "one" block and the values of the block B are provided to the DCT engine 60a for further processing as illustrated in connection with FIGS. 3 and 5.

As described above, the thresholds for each feature can be experimentally determined, and possibly varied. As non-limiting examples, the following thresholds can be used for each of the following features:

SAE: $K_{SAE}*QP$
MSE: $K_{MSE}*QP$
MAD: $K_{MAD}*QP$
VAR: $K_{VAR}*QP$
MAX: $K_{MAX}*QP$ where K for each feature is a constant that is empirically determined by extensive experimentation, as described above. As with the embodiment of FIG. 6, the thresholds for each feature can be varied by changing the values for K.

Thus, the embodiment 200b of FIG. 7 illustrates the use of a plurality of features to determine whether a block is a "zero" quantized block. The block is classified as a "zero" quantized block only if the values of all the features are below the respective thresholds for all the features. Otherwise, the zero block locater engine 200b will perform the DCT, quantization, zig-zag scan and variable length coding steps for that particular block B. This embodiment has the benefit of minimizing the potential of erroneously misclassifying blocks because it will require that all the features be examined, but it does include the drawback of increasing the computations at the video encoder 12a.

Figure 8:
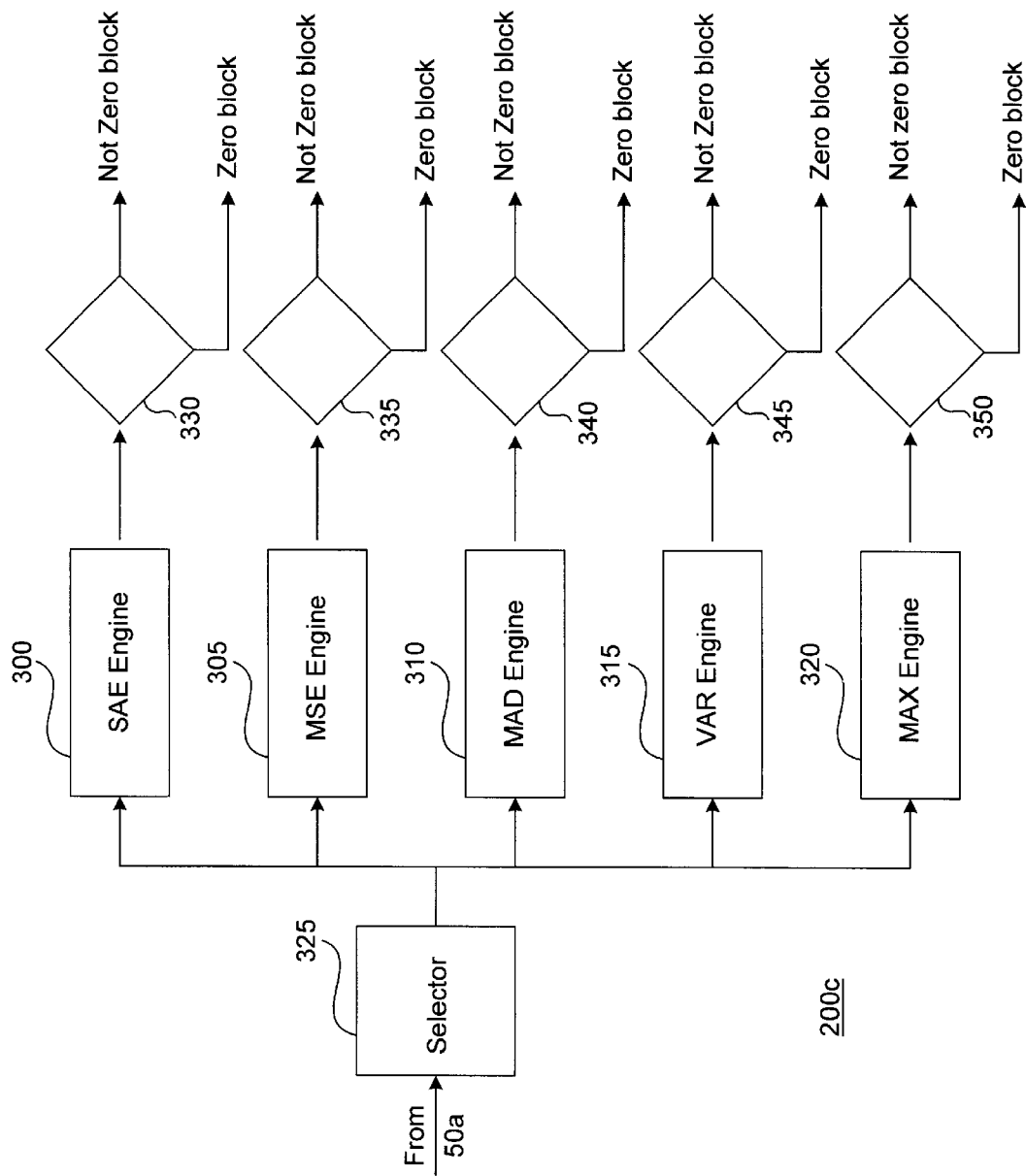
FIG. 8 illustrates a third embodiment of the zero block locater engine of FIG. 5.

FIG. 8 illustrates yet another embodiment of the zero block locater engine 200c according to the present invention. The zero block locater engine 200c includes a plurality of feature engines, including for example, an SAE engine 300, an MSE engine 305, a MAD engine 310, a VAR engine 315 and a MAX engine 320. A selector engine 325 receives the incoming block B from the QP engine 50a and selects one feature which is to be used in determining whether the block B is a "zero"quantized block. The selection of the specific feature is determined by measuring some local statistics based on a frame or a group of blocks. The feature selected can vary for different frames 10, or even for a group of blocks within a frame. The selector engine 325 then enables the engine for the selected feature, and the selected engine computes the value of the feature for that block B. The value of the selected feature is then provided to a corresponding comparator 330, 335, 340, 345 or 350, which determines whether the value of the selected feature is above the predetermined threshold for that feature. If the value of the selected feature is greater than that feature's threshold, then the comparator provides an output classifying the block B as a "one" block and the values of the block B are provided to the DCT engine 60a for further processing as illustrated in connection with FIGS. 3 and 5. If the value of the selected feature is less than or equal to that feature's threshold, then the block B is classified as a "zero" block and the comparator transmits a variable length code output indicating that the block B is a "zero" quantized block. The thresholds used in the zero block locater engine 200c can be the same as those set forth above, and can be varied in the manner described above.

Although five specific features have been described and illustrated hereinabove, other features can also be used in addition to, or in lieu of, the five features described above.

EXAMPLE 1

The zero block locater engine 200b of FIG. 7 was modified so that only two features, the SAE and MAX features, are used. The joint use of SAE and MAX is believed to be desirable because SAE and MAX are the least computationally intensive features, SAE has exhibited the best performance, and MAX is a good indicator of the presence of any edges. In this example, the threshold for SAE was selected to be 20*QP, while the threshold for MAX was selected to be KQP, with K equal to $15/16$.

Figure 9:
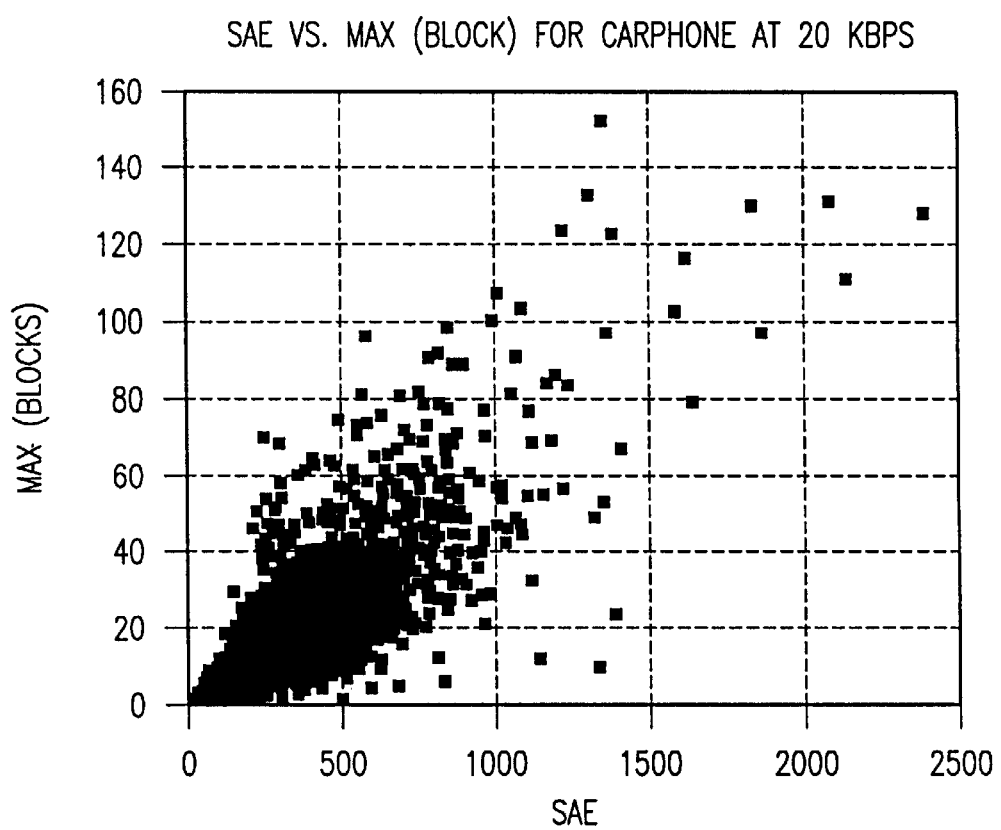
FIG. 9 is a scatter plot showing SAE and MAX for all the blocks for coding of the sequence "carphone" at 20 Kbps.

The effect of using MAX and SAE jointly to classify input blocks is illustrated in FIG. 9. In FIG. 9, the SAE and MAX values are plotted for all the blocks while coding the sequence carphone (a standard test sequence used for testing video coder-decoder) at 20 Kbps. FIG. 9 shows that SAE and MAX are highly correlated to each other. In fact, the actual correlation between the two feature vectors (Corr (SAE,MAX)) is 0.8445. This implies that use of the two features will result in the same decision most of the time.

Next, the result of using MAX and SAE jointly for classification is investigated.

FIG. 10 shows that adding MAX as an additional feature to SAE helps little in reducing the potential for erroneously misclassifying a block. FIG. 10 shows the distribution of "zero" blocks and "one" blocks in an SAE-MAX two-dimensional feature space, and in particular, shows that the two distributions heavily overlap each other. Thus, using SAE alone and using SAE and MAX jointly will produce almost the same performance.

EXAMPLE 2

The zero block locater engine 200a of FIG. 6, utilizing an SAE engine 210, was used to determine the actual amount of computational savings obtained while coding the sequence carphone at 20 Kbps. An SAE threshold of 20QP was used. It was noted that more than sixty percent of the blocks were classified as "zero" quantized blocks, for which the DCT, quantization, zig-zag scan, variable length coding, IDCT and inverse quantization steps can be omitted.

The computations required by the present invention in calculating the features do not significantly increase the overall computation load of the video encoder 12a, especially if SAE and MAX are used as the features. First, SAE and MAX are not computationally intensive. Calculating MAX involves 64 comparisons per block (i.e., for a block having a size of 64 pels), while SAE computation requires 64 additions per block. Second, it should be noted that, in any motion compensated video coding, during the motion estimation step 30, SAE is calculated for a 16×16 block. In addition, in the H.263 standard, SAE must be calculated for an 8×8 block if the advanced prediction mode is used. Thus, using SAE as a selected feature would require no additional computations.

Although the present invention has been described and illustrated as being implemented in hardware by employing engines or circuits, it is also possible to implement the present invention in software.

Although certain engines, circuits, components, subsystems, and blocks have been described above as including certain elements, it will be appreciated by those skilled in the art that such disclosures are non-limiting, and that different elements, or combinations thereof, can be provided for such engines, circuits, components, subsystems, and blocks without departing from the spirit and scope of the present invention.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method of encoding video data, comprising the steps of:

Performing motion estimation on a sequence of frames, each frame comprising a plurality of blocks;

classifying each frame as either an I frame, a P frame, or a B frame;

determining the quantization step size for each block or group of blocks;

selecting a threshold value for each block based upon the quantization step size;

classifying each blocks as a zero quantized block or a non-zero quantized block using the selected threshold value;

performing DCT, quantization, zig-zag scan, and variable length coding on the non-zero quantized blocks;

skipping the DCT, quantization, zig-zag scan and variable length coding steps for the zero quantized blocks;

performing DCT, quantization, zig-zag scan, and variable length coding on the given sequence of frames without skipping zero quantized blocks to generate an actual encoded result; and comparing the actual encoded result with the result from only performing DCT, quantization, zig-zag scan and variable length coding on the non-zero quantized blocks within the sequence of frames to determine the accuracy provided by the selected threshold value.

2. The method of claim 1, further comprising the steps of:

selecting at least one other threshold value;

using the other selected threshold values to repeat the steps of:
classifying each block as a zero quantized block or a non-zero quantized block and performing DCT, quantization, zig-zag scan and variable length coding on the non-zero quantized blocks, and
skipping the DCT, quantization, zig-zag scan and variable length coding steps for the zero quantized blocks;

comparing the actual encoded result with the result from only performing DCT, quantization, zig-zag scan and variable length coding on the non-zero quantized blocks classified from the other selected threshold values to determine the accuracy provided by the other selected threshold values; and determining which threshold value provides the optimal threshold value.

3. The method of claim 1, wherein the step of determining the accuracy provided by the threshold value includes the following steps:

calculating a misdetection rate indicating the number of actual zero blocks that are classified as non-zero blocks using the selected threshold value; and calculating a false alarm rate indicating the number of actual non-zero blocks that are classified as zero blocks using the selected threshold value.

* * * * *